(12) United States Patent
Waki et al.

(10) Patent No.: US 8,408,801 B2
(45) Date of Patent: Apr. 2, 2013

(54) OILING NOZZLE FOR THRUST BEARING

(75) Inventors: Yuichiro Waki, Tokyo (JP); Takashi Nakano, Tokyo (JP); Takaaki Kaikogi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 593 days.

(21) Appl. No.: 12/644,938

(22) Filed: Dec. 22, 2009

(65) Prior Publication Data

US 2010/0215299 A1   Aug. 26, 2010

(30) Foreign Application Priority Data

Feb. 25, 2009  (JP) .................................. 2009-042656

(51) Int. Cl.
*F16C 17/04* (2006.01)
*F16C 17/00* (2006.01)

(52) U.S. Cl. ........................................ 384/307; 384/311

(58) Field of Classification Search .................... 384/93, 384/122, 302, 303, 306–309, 311–313, 316, 384/322, 368, 369, 397, 398, 420
See application file for complete search history.

(56) References Cited

U.S. PATENT DOCUMENTS

| | | | | |
|---|---|---|---|---|
| 3,454,312 A | * | 7/1969 | Bielec | 384/307 |
| 4,077,682 A | * | 3/1978 | Gardner | 384/303 |
| 4,335,925 A | * | 6/1982 | Stopp | 384/125 |
| 5,046,864 A | * | 9/1991 | Boller | 384/308 |
| 5,738,447 A | * | 4/1998 | Nicholas | 384/117 |
| 2006/0088233 A1 | | 4/2006 | Ando et al. | |
| 2007/0025652 A1 | | 2/2007 | Satoji et al. | |

FOREIGN PATENT DOCUMENTS

| | | |
|---|---|---|
| CN | 1764792 | 4/2006 |
| CN | 1766356 | 5/2006 |
| JP | 62-100331 | 6/1987 |
| JP | 62-151430 | 9/1987 |
| JP | 63-178622 | 11/1988 |
| JP | 64-27524 | 2/1989 |
| JP | 1-65922 | 4/1989 |

OTHER PUBLICATIONS

International Search Report issued Jan. 26, 2010 in International (PCT) Application No. PCT/JP2009/070986 w/partial translation.
International Search Report issued in International (PCT) Application No.

* cited by examiner

*Primary Examiner* — James Pilkington
(74) *Attorney, Agent, or Firm* — Wenderoth, Lind & Ponack, LLP.

(57) ABSTRACT

An oiling nozzle for a thrust bearing improves the following capability of pads and achieves a higher bearing pressure of the thrust bearing. The oiling nozzles are arranged between respective pads disposed in positions facing the thrust surface of a thrust collar that protrudes radially outward from a rotor shaft, along the circumferential direction. Each oiling nozzle has a cylindrical stem and a rectangular-shaped mainframe whose heightwise middle portions of opposite lateral sides are provided with convex parts. Each convex part presents a semicircular disk shape in a plane view to be fitted into concave parts that are formed in lateral sides of the pads. A top portion located on a side opposite to the stem is formed with a plurality of nozzle holes for ejecting lubricating oil that has been supplied from the bottom of the stem toward a space between the thrust collar and the pads.

2 Claims, 8 Drawing Sheets

OILING NOZZLE FOR THRUST BEARING

BACKGROUND OF THE INVENTION

1. Field of the Invention

The present invention relates to an oiling nozzle for a thrust bearing for use in rotating machines such as a steam turbine, a gas turbine, a blower, and a compressor.

This application is based on Japanese Patent Application No. 2009-042656, the content of which is incorporated herein by reference.

2. Description of Related Art

An oiling nozzle for a thrust bearing disclosed in Japanese Unexamined Utility Model Application, Publication No. Sho 63-178622 is known as an example of an oiling nozzle for a thrust bearing for use in a steam turbine.

BRIEF SUMMARY OF THE INVENTION

However, regarding such a conventional oiling nozzle for a thrust bearing, a lateral side of the oiling nozzle and a lateral side of a pad are contacted by surfaces (surface-to-surface contact). For this reason, the pad can not be rotated about an axis parallel to the rotation axis of the rotor shaft (rotation shaft). This leads to a problem of insufficient following capability (tilting capability) of the pad.

The present invention was made to address such a situation, with an object of providing an oiling nozzle for a thrust bearing, which is capable of improving the following capability of the pad, and is capable of achieving a higher bearing pressure of the thrust bearing through efficient lubrication.

In order to achieve the above object, the present invention employs the following solutions.

The oiling nozzle for a thrust bearing according to a first aspect of the present invention is an oiling nozzle which is for use in a thrust bearing and is arranged between pads disposed in positions facing the thrust surface of a thrust collar that protrudes radially outward from a rotor shaft, along the circumferential direction of the rotor shaft. The oiling nozzle comprises a cylindrical stem; and a rectangular mainframe whose heightwise middle portions of opposite lateral sides are provided with convex parts each presenting a semicircular disk shape in a plane view, to be fitted into concave parts that are formed in lateral sides of the pads, and whose top portion located on the side opposite to the stem is formed with a plurality of nozzle holes for ejecting lubricating oil that has been supplied from the bottom of the stem toward a space between the thrust collar and the pads.

According to the oiling nozzle for a thrust bearing of the first aspect of the present invention, the lateral sides of the pad are point-supported by the convex parts of the oiling nozzles of this thrust bearing. Thus, the pad can be rotated about the axis parallel to the rotation axis of the rotor shaft. Therefore, the following capability (tilting capability) of the pad can be improved.

Moreover, according to the oiling nozzle for a thrust bearing of the first aspect of the present invention, the lubricating oil is thoroughly supplied (ejected) from the nozzle holes formed in the top portion of the mainframe toward the lateral sides of the pad, and the thus supplied lubricating oil can be efficiently supplied to the sliding surfaces of the pads. Therefore, the metal temperature of the pads can be reduced lower than conventional cases at a high bearing pressure (for example, over 6 MPa).

The above-mentioned oiling nozzle for a thrust bearing is more preferable if the top portion of the mainframe is formed with two lateral faces sloping toward the top face, and these lateral faces are formed with the nozzle holes.

According to such an oiling nozzle for a thrust bearing, the lubricating oil that has been supplied from the bottom can be efficiently supplied (ejected) toward the adjacent pads, and the like, and the thus supplied lubricating oil can be efficiently supplied to the sliding surfaces of the pads.

The thrust bearing according to a second aspect of the present invention comprises an oiling nozzle for use in a thrust bearing which is capable of offering an excellent following capability of pads and is capable of suppressing an increase in the metal temperature even if the bearing pressure is high (for example, over 6 MPa).

The thrust bearing of the second aspect of the present invention can be applied for rotating machines (such as a steam turbine, a gas turbine, a blower, and a compressor) whose size and whose bearing pressure have been increasing.

The thrust bearing according to the present invention can offer the effect of improving the following capability of pads, as well as achieving a higher bearing pressure of the thrust bearing through efficient lubrication.

DETAILED DESCRIPTION OF THE INVENTION

Hereunder is a description of one embodiment of an oiling nozzle for a thrust bearing according to the present invention (hereinunder, referred to the "oiling nozzle"), with reference to FIG. 1 through FIG. 10.

Figure 1:
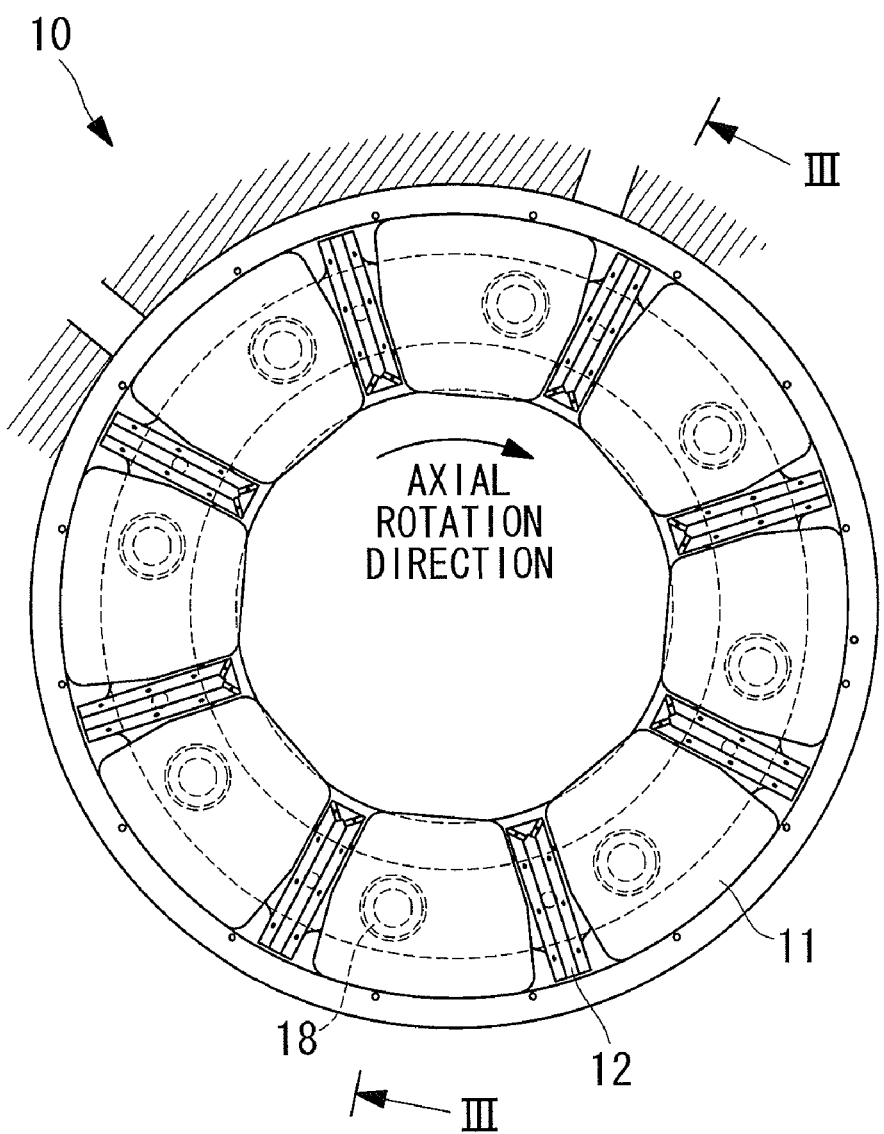
FIG. 1 is a front view of a thrust bearing comprising oiling nozzles according to one embodiment of the present invention, as well as being a cross sectional view taken along the line I-I of FIG. 3.
Figure 2:
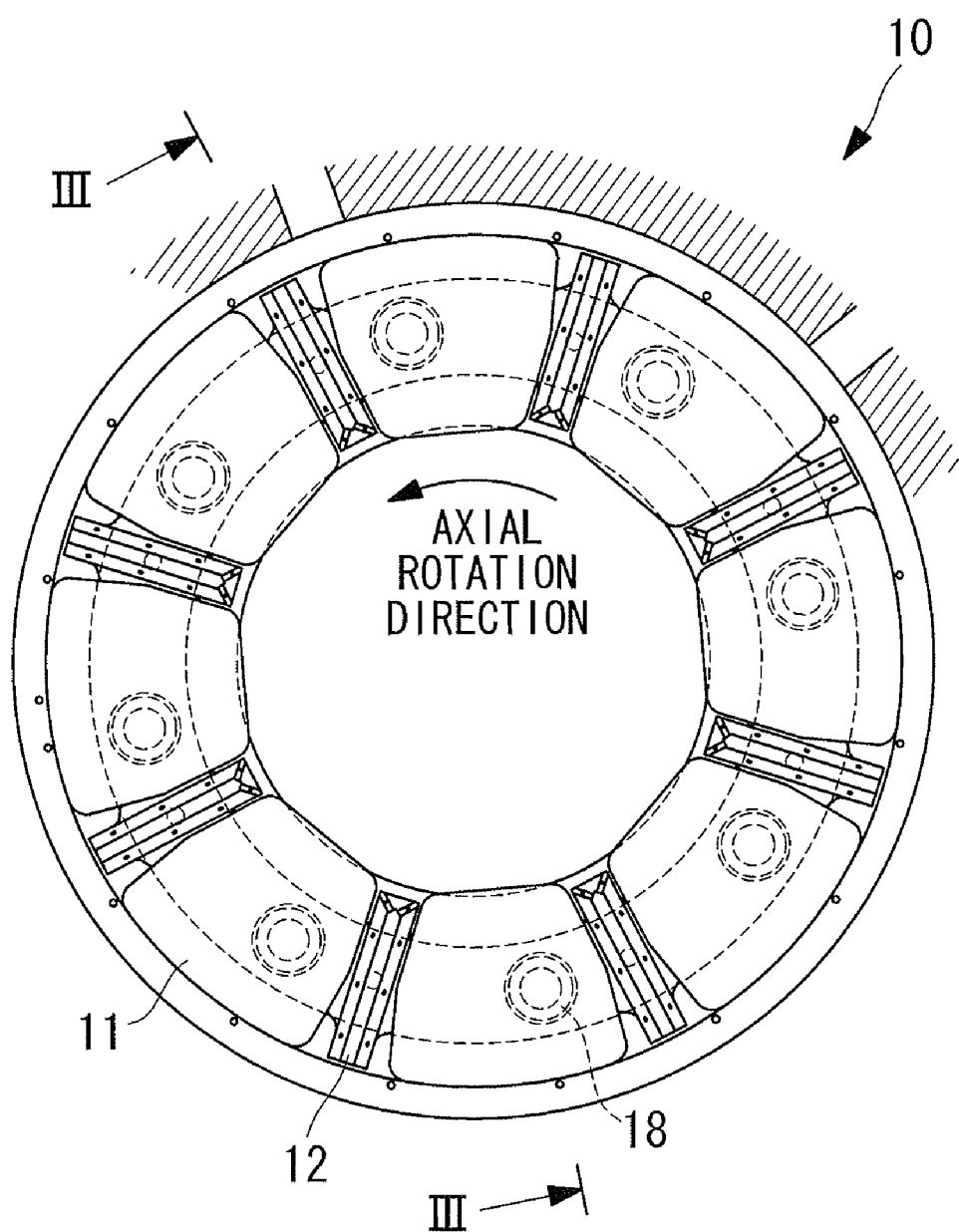
FIG. 2 is a front view of the thrust bearing comprising the oiling nozzles according to one embodiment of the present invention, as well as being a cross sectional view taken along the line II-II of FIG. 3.
Figure 3:
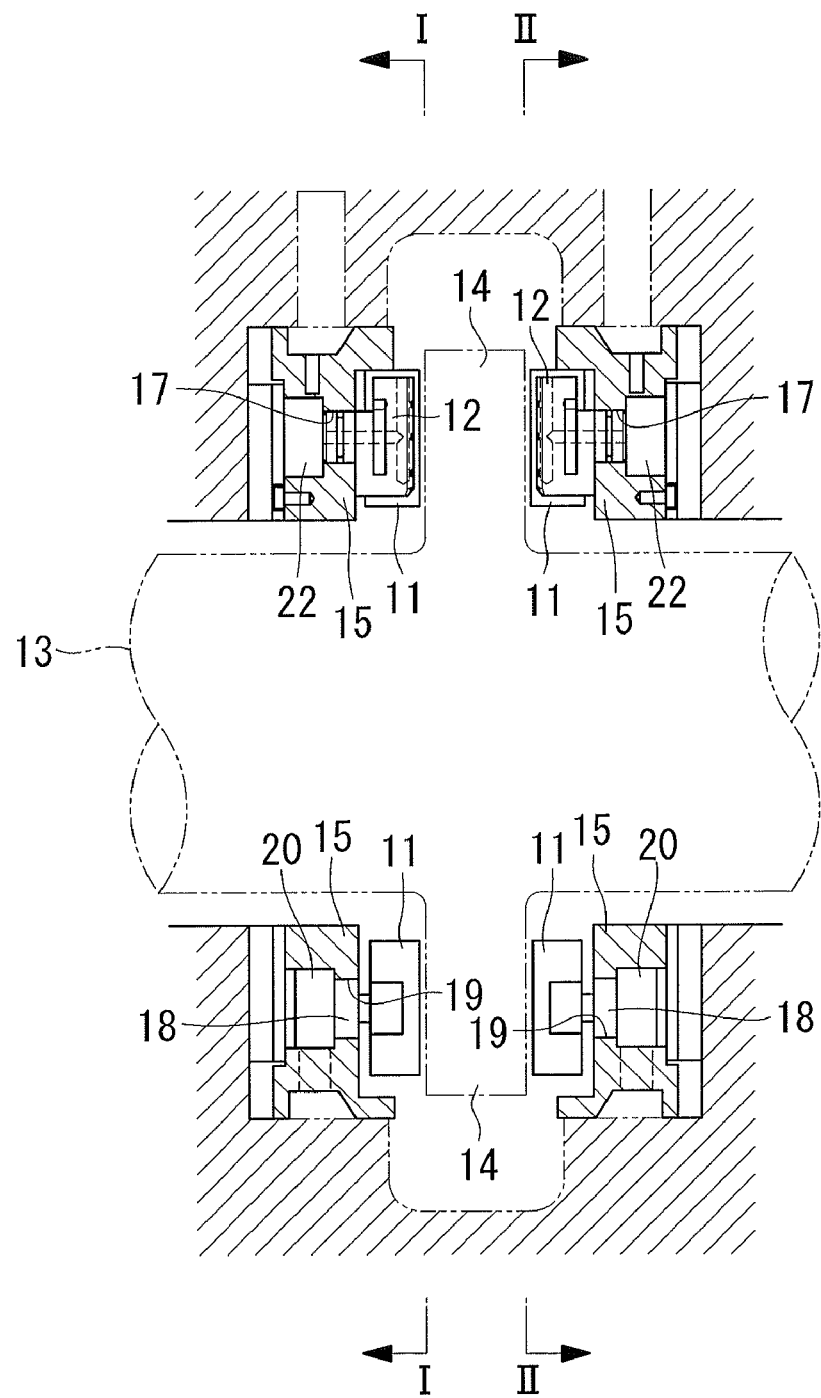
FIG. 3 is a cross sectional view taken along the line III-III of FIG. 1 and FIG. 2.
Figure 4:
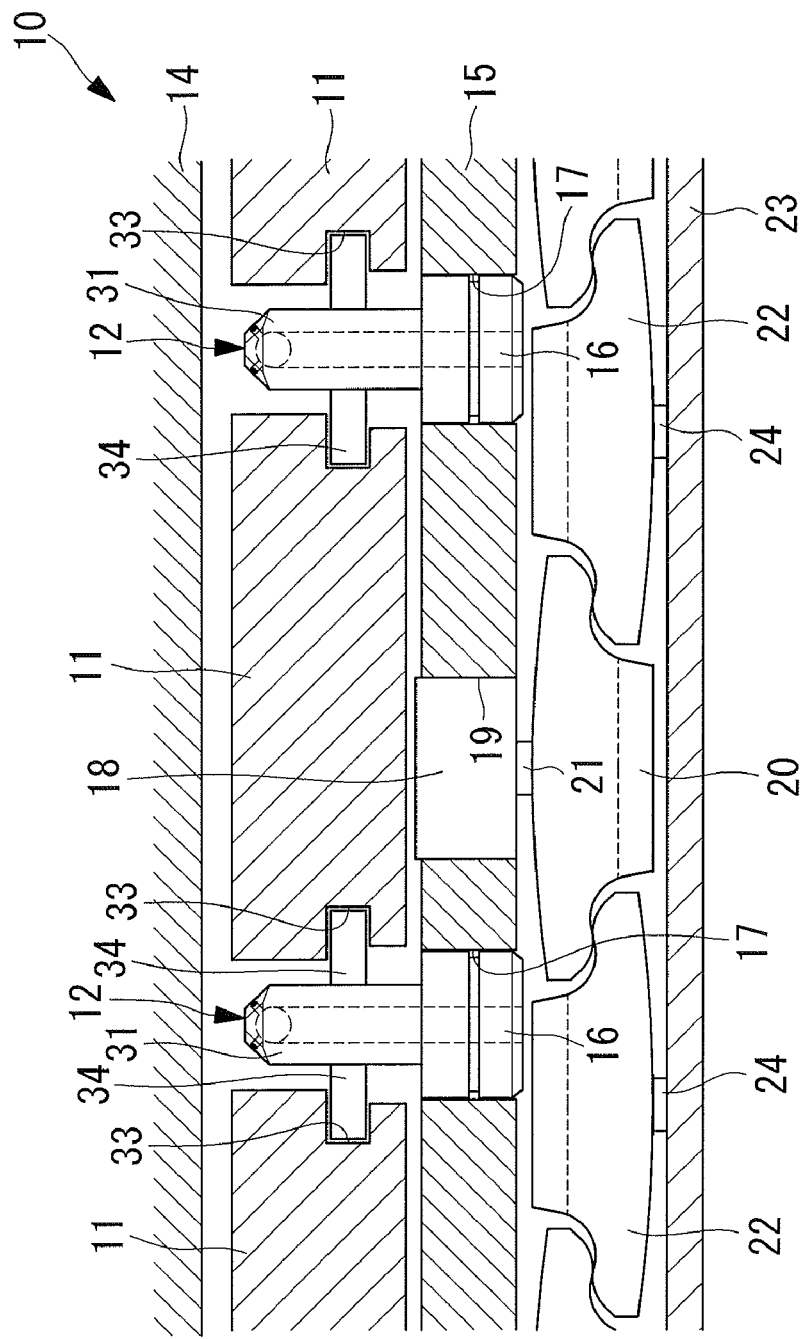
FIG. 4 is a cross sectional view of a part of the thrust bearing comprising the oiling nozzles according to one embodiment of the present invention, taken along the circumferential direction.
Figure 5:
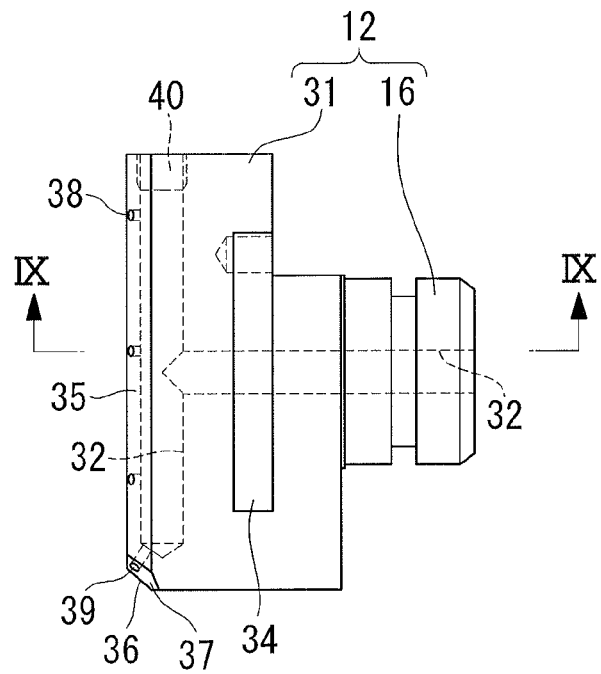
FIG. 5 is a side view of the oiling nozzle according to one embodiment of the present invention.
Figure 6:
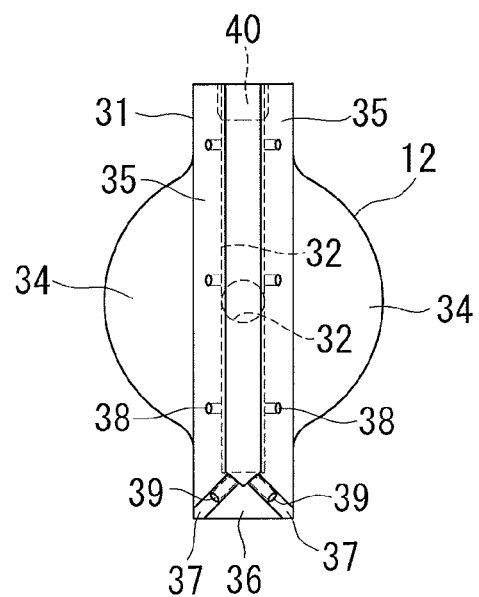
FIG. 6 is a plan view of the oiling nozzle according to one embodiment of the present invention.
Figure 7:
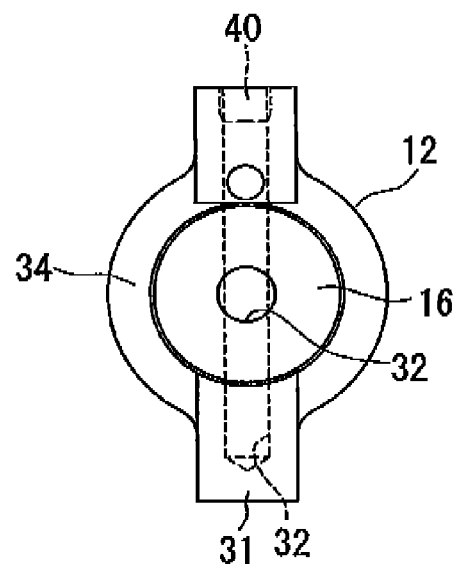
FIG. 7 is a bottom view of the oiling nozzle according to one embodiment of the present invention.
Figure 8:
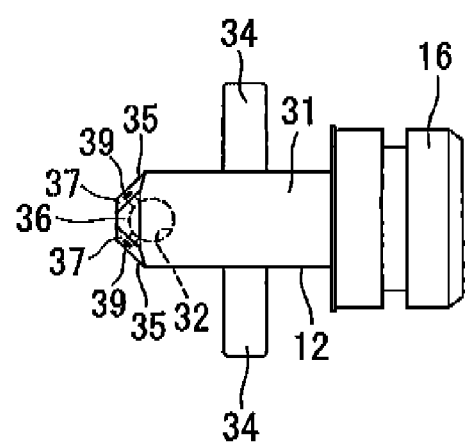
FIG. 8 is a front view of the oiling nozzle according to one embodiment of the present invention.
Figure 9:
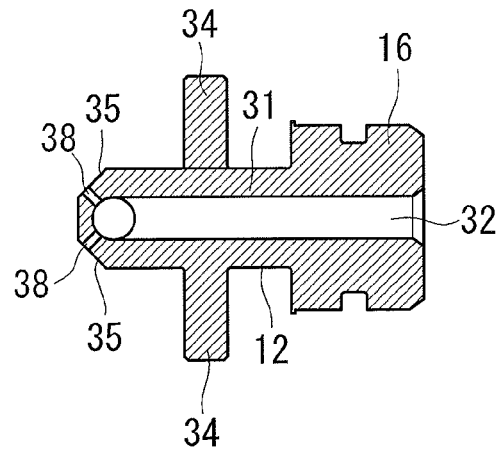
FIG. 9 is a cross sectional view taken along the line IX-IX of FIG. 5.
Figure 10:
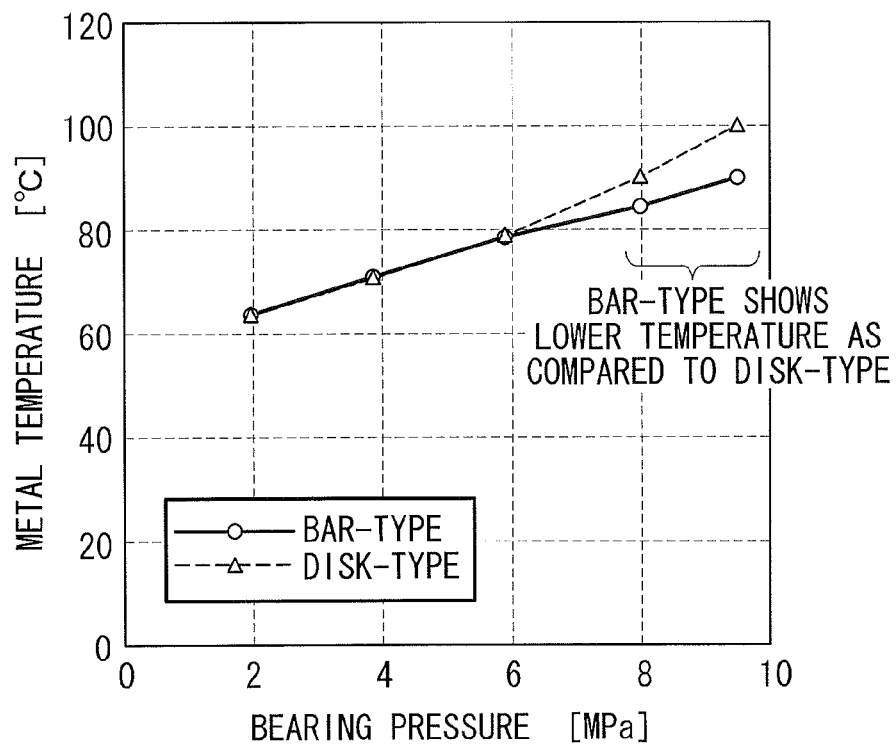
FIG. 10 is a graph showing the experimental result obtained by the operation of the thrust bearing comprising the oiling nozzles according to one embodiment of the present invention.

FIG. 1 is a front view of a thrust bearing comprising the oiling nozzles according to this embodiment, as well as being a cross sectional view taken along the line I-I of FIG. 3. FIG. 2 is a front view of the thrust bearing comprising the oiling nozzles according to this embodiment, as well as being a cross sectional view taken along the line II-II of FIG. 3. FIG. 3 is a cross sectional view taken along the line III-III of FIG. 1 and FIG. 2. FIG. 4 is a cross sectional view of a part of the thrust bearing comprising the oiling nozzles according to this embodiment, taken along the circumferential direction. FIG. 5 is a side view of the oiling nozzle according to this embodiment. FIG. 6 is a plan view of the oiling nozzle according to this embodiment. FIG. 7 is a bottom view of the oiling nozzle according to this embodiment. FIG. 8 is a front view of the oiling nozzle according to this embodiment. FIG. 9 is a cross sectional view taken along the line IX-IX of FIG. 5. FIG. 10 is a graph showing the experimental result obtained by the operation of the thrust bearing comprising the oiling nozzles according to this embodiment.

As shown in FIG. 1 and FIG. 2, the thrust bearing 10 comprises, for example, eight pads 11 and eight oiling nozzles 12 arranged between these pads 11 along the circumferential direction, as main components.

As shown in FIG. 3, the pads 11 are disposed in positions facing the thrust surfaces of a thrust collar 14 which protrudes radially outward from a rotor shaft (rotation shaft) 13. For example, these pads 11 are made of a tin-based alloy or a PEEK (polyetheretherketone) resin. In addition, as shown in FIG. 1, FIG. 2, and FIG. 4, predetermined spaces are made between these pads 11.

As shown in FIG. 4, a carrier ring 15 presenting an annular shape in a plane view is disposed on the back sides of the pads 11. In the carrier ring 15 are formed a plurality of (first) through holes 17 piercing in the plate thickness direction for rotatably receiving one ends (lower ends) of stems 16 of the oiling nozzles 12, and a plurality of (second) through holes 19 piercing in the plate thickness direction for receiving pillars 18.

The pillar 18 has its outer circumferential surface contacted with the inner circumferential surface of the through hole 19, and has its overall surface (or a part of the surface) tightly fit in the through hole 19 while projecting itself from the surface of the carrier ring 15. In addition, (first) pivots 21 which slidably support (first) leveling plates 20 are provided on the back side of the pillar 18.

The leveling plates 20 are arranged at predetermined intervals along the circumferential direction. (Second) leveling plates 22 are disposed between these leveling plates 20.

As shown in FIG. 1, the pillar 18 is provided at a 65% position in the widthwise direction of the pad 11, which is on the forward side in the axial rotation direction of the rotor shaft 13.

In addition, the term "back side of the pad 11" refers to the side opposite to the side which faces the thrust surface of the thrust collar 14, the term "front side of the pillar 18" refers to the side which faces the back side of the pad 11, and the term "front side of the carrier ring 15" refers to the side which faces the back side of the pad 11.

The leveling plates 20 and the leveling plates 22 are housed in a space made between the carrier ring 15 and the carrying case (back cover) 23. (Second) pivots 24 which slidably support the leveling plates 22 are provided on the surface of the carrying case 23. In addition, a part of the flat face formed at the bottom of each leveling plate 22 is provided in a position contactable with a part of the flat face formed at the bottom of the stem 16 of the oiling nozzle 12.

The term "surface of the carrying case 23" refers to the side which faces the side of the carrier ring 15 having the projecting pivots 21.

As shown in every one of FIG. 5 through FIG. 9, the oiling nozzle 12 according to this embodiment comprises a stem 16 and a mainframe 31.

The stem 16 is an approximately cylindrical member whose center is formed with an oiling hole 32 along the axial direction, for leading the lubricating oil that has been supplied from the bottom side to the mainframe 31.

The mainframe 31 is a rectangular member whose heightwise middle portions (middle portions in the left and right direction in FIG. 5) of the opposite lateral sides are provided with convex parts (brims) 34, each presenting a semicircular disk shape in a plane view, to be tightly fitted into concave parts 33, each presenting a rectangular shape in a cross-sectional view, formed in lateral sides of the pads 11 (refer to FIG. 4). In addition, the lengthwise center (center in the top and bottom direction in FIG. 5) of the mainframe 31 is formed with the oiling hole 32 along the heightwise direction.

The widthwise center (center in the left and right direction in FIG. 6) of one end portion of the mainframe 31 (a portion at the end opposite to the stem 16 side) is formed with the oiling hole 32 along the lengthwise direction. Moreover, the top portion of the mainframe 31 (the distal end of the end portion of the mainframe 31) is formed with two lateral faces 35 sloping toward the top face, one front face (frontage) 36, and two intermediate facets 37 which are positioned between these lateral faces 35 and front face 36 to connect these lateral faces 35 and front face 36. These lateral faces 35, front face 36, and intermediate facets 37 are bevels sloping closer to each other as they get toward the top face. The rear face (back face) positioned on the side opposite to the front face 36 forms a same plane with the rear face of the mainframe 31 not having the top portion.

Each lateral face 35 is formed with a plurality of (three in this embodiment) (first) nozzle holes 38 for ejecting the lubricating oil that has been led through the oiling hole 32 toward the adjacent pads 11, and the like. Each intermediate facet 37 is formed with at least one (one in this embodiment) (second) nozzle hole 39 for ejecting the lubricating oil that has been led through the oiling hole 32 toward the adjacent pads 11, and the like. The nozzle holes 38 are open in the normal direction of the lateral face 35. The nozzle hole 39 is open in the normal direction of the intermediate facet 37.

The reference sign 40 in FIG. 5 through FIG. 7 denotes a plug for closing one end of the oiling hole 32 made in the end portion of the mainframe 31 by a drill (not shown).

According to the oiling nozzle 12 of this embodiment, the back side of the pad 11 is point-supported by the front side of the pillar 18, and the lateral sides of the pad 11 are point-supported by the convex parts 34 of the oiling nozzles 12. Thus, the pad 11 can be rotated about the axis perpendicular to the rotation axis of the rotor shaft 13, as well as about the axis parallel to the rotation axis of the rotor shaft 13. Therefore, the following capability (tilting capability) of the pad can be improved.

In addition, according to the oiling nozzle 12 of this embodiment, the lubricating oil is thoroughly supplied (ejected) from the nozzle holes 38 and 39 of the oiling nozzle 12 toward the lateral sides of the pads 11, and the thus supplied lubricating oil can be efficiently supplied to the sliding surfaces of the pads 11. Therefore, the metal temperature can be reduced lower than conventional cases at a high bearing pressure (for example, over 6 MPa).

The thrust bearing according to the present invention comprises the oiling nozzles 12 for use in a thrust bearing, which offer an excellent following capability of the pads 11, and are capable of suppressing an increase in the metal temperature even if the bearing pressure is high (for example, over 6 MPa). Therefore, the thrust bearing can be applied to rotating machines (such as a steam turbine, a gas turbine, a blower, and a compressor) whose size and whose bearing pressure have been increasing.

FIG. 10 is a graph showing the experimental result obtained by the operation of the thrust bearing 10 comprising the oiling nozzles 12 according to this embodiment, wherein the x axis indicates the bearing pressure [MPa] and the y axis indicates the metal temperature [° C.].

As shown in FIG. 10, the thrust bearing 10 comprising the bar-type oiling nozzles 12 according to this embodiment showed lower metal temperature than the metal temperature of a thrust bearing not comprising the oiling nozzles 12 according to this embodiment (that is to say, a thrust bearing comprising disk-type oiling nozzles) at a high bearing pressure (for example, over 6 MPa). This is an experimental result which strongly supports the above-mentioned operations and effects of the oiling nozzle 12 according to this embodiment.

The present invention is not limited to the embodiment described above, but can be variously modified or changed without departing from the gist of the present invention.

Figure 11:
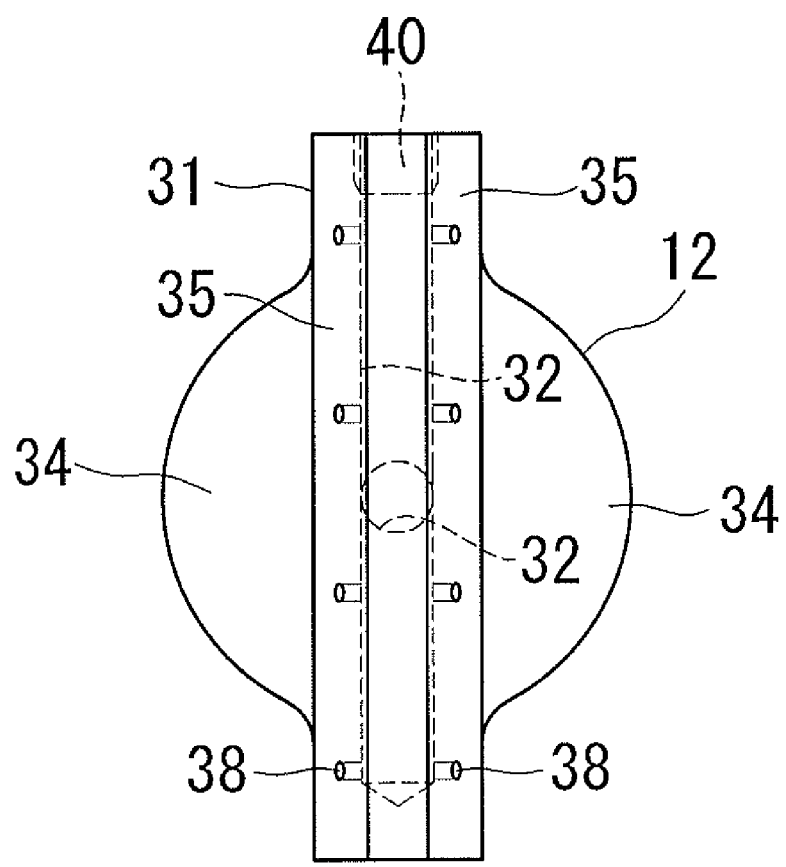
FIG. 11 is a plan view of an oiling nozzle according to another embodiment of the present invention.

In addition, the above-mentioned embodiment was described with reference to the structure in which the lateral faces 35 and the front face 36 are connected via the intermediate facets 37. However, the structure may also be such that the lateral faces 35 and the front face 36 are connected not via the intermediate facets 37. The structure may also be as shown in FIG. 11 where neither front face 36 nor intermediate facet 37 is present. If such a structure is, as shown in FIG. 11, the nozzle holes 38 which are open in the normal direction of the lateral face 35 are to be formed in the lateral face 35, instead of the nozzle holes 39.

Furthermore, the pillar 18 may also be provided at any position as long as it is within a 50% to 65% position in the widthwise direction of the pad 11 on the forward side in the axial rotation direction of the rotor shaft 13.

What is claimed is:

1. An oiling nozzle for use in a thrust bearing, in which said oiling nozzle is arranged between pads disposed in positions facing a thrust surface of a thrust collar that protrudes outwardly in a radial direction from a rotor shaft and along a circumferential direction of the rotor shaft, said oiling nozzle comprising:
    a cylindrical stem; and
    a rectangular mainframe that is connected with said cylindrical stem, said rectangular mainframe having:
        convex parts on opposite sides of said rectangular mainframe at a middle position along an axis of said oiling nozzle extending in a direction from said rectangular mainframe toward said cylindrical stem, said convex parts each having the appearance of a semicircular disk as seen looking along the axis in the direction from said rectangular mainframe toward said cylindrical stem for fitting into concave parts in sides of the pads, and
        a top portion located on a side of said rectangular mainframe that is opposite to a side of said rectangular mainframe on which said cylindrical stem is located, said top portion having a plurality of nozzle holes for ejecting lubricating oil that has been supplied from a bottom portion of said cylindrical stem toward a space between the thrust collar and the pads,
    wherein at least one of said plurality of nozzle holes is formed perpendicular to a longitudinal direction of said rectangular mainframe and at least one other of said plurality of nozzle holes is formed at a slant to the longitudinal direction of said rectangular mainframe as seen looking along the axis in the direction from said rectangular mainframe toward said cylindrical stem;
    wherein said top portion of said rectangular mainframe has two lateral faces that slope to a top face, a front face, and two intermediate faces positioned between said two lateral faces and said front face so as to connect said two lateral faces and said front face, and wherein said two lateral faces have a number of said plurality of nozzle holes therein and said two intermediate faces each have at least one of said plurality of nozzle holes therein.

2. An oiling nozzle in combination with a thrust bearing, comprising:
    pads disposed in positions facing a thrust surface of a thrust collar that protrudes outwardly in a radial direction from a rotor shaft and along a circumferential direction of the rotor shaft; and
    said oiling nozzle arranged between said pads, said oiling nozzle comprising:
        a cylindrical stem; and
        a rectangular mainframe that is connected with said cylindrical stem, said rectangular mainframe having:
            convex parts on opposite sides of said rectangular mainframe at a middle position along an axis of said oiling nozzle extending in a direction from said rectangular mainframe toward said cylindrical stem, said convex parts each having the appearance of a semicircular disk as seen looking along the axis in the direction from said rectangular mainframe toward said cylindrical stem for fitting into concave parts in sides of said pads, and
            a top portion located on a side of said rectangular mainframe that is opposite to a side of said rectangular mainframe on which said cylindrical stem is located, said top portion having a plurality of nozzle holes for ejecting lubricating oil that has been supplied from a bottom portion of said cylindrical stem toward a space between said thrust collar and said pads,
    wherein at least one of said plurality of nozzle holes is formed perpendicular to a longitudinal direction of said rectangular mainframe and at least one other of said plurality of nozzle holes is formed at a slant to the longitudinal direction of said rectangular mainframe as seen looking along the axis in a direction from said rectangular mainframe toward said cylindrical stem;
    wherein said top portion of said rectangular mainframe has two lateral faces that slope to a top face, a front face, and two intermediate faces positioned between said two lateral faces and said front face so as to connect said two lateral faces and said front face, and wherein said two lateral faces have a number of said plurality of nozzle holes therein and said two intermediate faces each have at least one of said plurality of nozzle holes therein.

* * * * *